(12) United States Patent
Böldt et al.

(10) Patent No.: US 7,181,291 B2
(45) Date of Patent: Feb. 20, 2007

(54) METHOD AND APPARATUS AND CONTROL SYSTEM FOR CONTROLLING HOUSEHOLD APPLIANCES

(75) Inventors: Frank Böldt, Brieselang (DE); Harald Moschütz, Grossbeeren (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 135 days.

(21) Appl. No.: 10/609,944

(22) Filed: Jun. 30, 2003

(65) Prior Publication Data

US 2004/0039457 A1  Feb. 26, 2004

Related U.S. Application Data

(63) Continuation of application No. PCT/EP01/12942, filed on Nov. 21, 2001.

(30) Foreign Application Priority Data

Dec. 29, 2000  (DE) ............... 100 65 674

(51) Int. Cl.
- *G06F 15/16* (2006.01)
- *G06F 15/177* (2006.01)
- *G06F 9/44* (2006.01)
- *G05B 11/01* (2006.01)
- *G05B 19/42* (2006.01)
- *O05B 15/00* (2006.01)

(52) U.S. Cl. ............... 700/17; 700/83; 717/168; 709/219; 709/220

(58) Field of Classification Search ........ 709/222–224, 709/219–220; 700/17, 83, 86; 717/168
See application file for complete search history.

(56) References Cited

U.S. PATENT DOCUMENTS 5,553,123 A * 9/1996 Chan et al. ............ 379/102.03

(Continued)

FOREIGN PATENT DOCUMENTS

WO  99/65192  12/1999

(Continued)

OTHER PUBLICATIONS

WayBAck Machine, http://web.archive.org/web/*/http://www.intuit.com/ ☐☐search performed for Intuit, copies of relevant pages are enclosed (pp. 1-6).*

Primary Examiner—Anthony Knight
Assistant Examiner—Ronald D. Hartman, Jr.
(74) Attorney, Agent, or Firm—Russell W. Warnock; Craig J. Loest

(57) ABSTRACT

A method and an apparatus for controlling a household appliance controlled using an internal control unit, and also a control system that improves current control of the household appliances includes connecting the household appliance to a local area network and, following a request by a user, receiving a control information item from a network, the control information item being evaluated and/or converted at a location of the household appliance to control the household appliance.

32 Claims, 2 Drawing Sheets

U.S. PATENT DOCUMENTS

| | | | |
|---|---|---|---|
| 5,987,105 A * | 11/1999 | Jenkins et al. | 379/106.01 |
| 6,026,150 A * | 2/2000 | Frank et al. | 379/90.01 |
| 6,049,671 A | 4/2000 | Slivka et al. | |
| 6,052,750 A | 4/2000 | Lea | |
| 6,121,593 A * | 9/2000 | Mansbery et al. | 219/679 |
| 6,167,120 A * | 12/2000 | Kikinis | 379/90.01 |
| 6,256,378 B1 * | 7/2001 | Iggulden et al. | 379/102.03 |
| 6,345,294 B1 * | 2/2002 | O'Toole et al. | 709/222 |
| 6,370,141 B1 * | 4/2002 | Giordano et al. | 370/386 |
| 6,425,156 B1 * | 7/2002 | Knopp et al. | 8/159 |
| 6,587,739 B1 * | 7/2003 | Abrams et al. | 700/83 |
| 6,591,151 B1 * | 7/2003 | Knopp et al. | 700/83 |
| 6,665,384 B2 * | 12/2003 | Daum et al. | 379/102.03 |
| 6,687,486 B2 * | 2/2004 | Grzeczkowski | 455/3.05 |
| 6,690,979 B1 * | 2/2004 | Smith | 700/65 |
| 6,873,876 B1 * | 3/2005 | Aisa | 700/86 |
| 6,906,617 B1 * | 6/2005 | Van der Meulen | 340/538 |
| 2001/0025392 A1 * | 10/2001 | Youn et al. | 8/159 |
| 2001/0039460 A1 * | 11/2001 | Aisa | 700/17 |
| 2002/0032491 A1 * | 3/2002 | Imamura et al. | 700/79 |
| 2002/0095483 A1 * | 7/2002 | Lee et al. | 709/219 |
| 2003/0200340 A1 * | 10/2003 | Hutter | 709/250 |
| 2004/0083471 A1 * | 4/2004 | Nam et al. | 717/168 |
| 2005/0031099 A1 * | 2/2005 | Iggulden et al. | 379/102.03 |

FOREIGN PATENT DOCUMENTS

WO     00/75774 A2     12/2000

\* cited by examiner

METHOD AND APPARATUS AND CONTROL SYSTEM FOR CONTROLLING HOUSEHOLD APPLIANCES

CROSS-REFERENCE TO RELATED APPLICATION

This application is a continuation of copending International Application No. PCT/EP01/12942, filed Nov. 21, 2001, which designated the United States and was not published in English.

BACKGROUND OF THE INVENTION

Field of the Invention

The present invention relates to a method for controlling household appliances, to a corresponding apparatus, and to a corresponding control system.

Control units for previous household appliances have electrical and/or electronic controllers representing an entire functional scope for the appliance. In the event of the scope of the functions that can be performed in the household appliance being extended, the control unit's hardware and/or software is adjusted as appropriate. Updating the sequence control, like repair, requires that the customer service engineer be present at the location of the household appliance. In addition, it normally entails the customer service engineer opening the household appliance and replacing control components. Adjusting household appliances at the customer's premises or retrospectively approving the properties of the appliance on account of scientific and/or technical progress made in the interim is barely possible, even in more modern household appliances, on account of this necessary involvement. This means that the household appliances age very quickly on account of the limited scope of their functions and their incapacity to adapt to new environmental/or application parameters, for example, specific measures for saving water and electricity, the use of new kinds of washing substances, or the application of the household appliance to new products.

SUMMARY OF THE INVENTION

It is accordingly an object of the invention to provide a method and apparatus and control system for controlling household appliances that overcomes the hereinafore-mentioned disadvantages of the heretofore-known devices and methods of this general type and that improves provision of current controllers for household appliances.

With the foregoing and other objects in view, there is provided, in accordance with the invention, a method for controlling a household appliance, including the steps of connecting the household appliance to a local area network, the household appliance having an internal control unit for controlling the household appliance, sending a message from the household appliance to the local area network to request control information, the message containing a basic information item including a new request from a user for a control program, the control program being at least one of a new control program, an improved control program, and an extended control program, the control information having at least one of low-level control commands, subprograms, and programs, receiving, with the household appliance, the control information from the local area network following a request by the user, and controlling the household appliance by at least one of evaluating and converting the control information at a location of the household appliance.

In an inventive method for controlling a household appliance, a household appliance is connected to a local area network. As part of such a network, the household appliance is configured for sending and receiving information. Following a request by a user of the household appliance, the invention provides for the household appliance to receive from the network a control information item that is evaluated and/or converted at the location to control the household appliance. As a result of the household appliance being connected to a local area network, the household appliance can use all properties that are available in the local area network as a result of the other appliances connected to the network, this substantially relates to the conditioning of the data that now no longer imperatively takes place in the household appliance itself, but, rather, takes place only at the location of the household appliance, using a network structure, i.e., within the local area network. The control information item is, then, transferred through the local area network only in electronic form. Hence, changing and/or sending the control properties of a household appliance no longer requires the intervention of a customer service engineer in situ. The control information item now includes only machine commands and/or software that acts on the household appliance even without the intervention of the user. Experience has shown that the volumes of data needing to be processed for such a purpose are relatively small, i.e., their scope is much smaller than is the case when music or pictures are transmitted, for example. Because transmission in real time is not imperatively necessary, a lower data rate can, additionally, be taken be taken as a basis for a transmission standard, which can make conversion very good value.

A system for networking household appliance per se is known, by way of example, from the product specification "Das Siemens Home Electronic Systems HES"[Siemens Home Electronic System HES] from Siemens Electrogeräte GmbH, Munich, 1997. The central basis for controlling and using household appliances as networked applications is a personal computer ("PC"). Such a computer can be used only to control and monitor household appliances within the home electronic system ("HES"), however. To this end, a number of internal states for the connected household appliances are mapped in the system. The HES Application is, thus, purely PC based and is, therefore, dependent on a particular platform. In no instance is information for control admitted into the local area network from outside, which means that an HES as a local area network cannot make contact with an external service provider either. Use of interfaces to an HES system is not known.

By contrast, the present invention provides interfaces in a local area network that are opened at the request of a user. Different forms of message sending and information receipt by the local area network and exemplary embodiments of conversion of control information are discussed separately below with reference to developments, various embodiments, and an exemplary embodiment.

In accordance with another mode of the invention, control information is requested by virtue of a message being sent from the household appliance to the local area network. It is, advantageously, sent through the local area network to a service provider. To simplify editing by the customers, on one hand, and by the implementing service provider, on the other hand, the message can be in the form of a questionnaire for the subsequent production of tailored control information or software.

The message, preferably, contains a basic information item. The basic information item contained in the message can also be new customer demands on a novel/or improved and/or extended control program. These demands can be transmitted in the form of questionnaire or other type of form for the tailored production of control information. In line with the invention, a manufacturer of household appliances can be kept as a service partner for a customer following the purchase of a household appliance. This type of subsequent customer care also allows the manufacturer of household appliances to develop products further on a basis of the reports from the customers. In addition, the opportunity for continual contact enhances the customers' brand loyalty.

In accordance with a further mode of the invention, the message is sent from the local area network to the service provider, preferably, by telephone, fax, email, or another communication channel for voice or data transmission. It is, therefore, not necessary for any additional transmission path or apparatuses to be set up for apparatuses operating on a basis of a method in accordance with the present invention. Existing apparatuses are used again or are incorporated into the local area network and are used jointly.

In accordance with an added mode of the invention, the respectively required control information item is developed as a program taking into account all transmitted system data and other settings and also demands from the user. In particular, this development takes place with a service provider with mapping on a corresponding virtual machine. This involves a neural network preferably being used as the development environment.

Interfaces to individual basic functions are standardized in the control software for the household appliance. These basic functions are in the form of subprograms and are repeated within individually produced subprograms or normal control programs. Hence, in the event of a modification, these modules need to be transmitted to the location of the household appliance at once, or they can be reused, as it were, by combining them with new program parts.

In accordance with an additional mode of the invention, the household appliance is provided with control software having individually produced special programs and normal control programs and interfaces to individual basic functions repeatedly occurring as subprograms within at least one of the individually produced special programs and the normal control programs in the control software are made available.

In accordance with yet another mode of the invention, the control information is transmitted to household appliance through the local area network in the form of pure data. Preferably, the control information is in the form of low-level control commands or machine language. In the forms cited by way of example, the controlled information is very compact, which means that the total volume of data can also be produced further thereby. On the other hand, low-level control commands or control information in a machine language can be understood largely directly by the controller, which means that it can be translated directly by the controller. To accelerate and relieve the burden on control, no further work or computation steps, therefore, need to be provided.

In accordance with yet a further mode of the invention, the program in question or the control information is sent to the household appliance at its location. The control information is transmitted through the network to the household appliance. The control information is sent to the location of the household appliance by a service provider in the form of a data medium, such as a magnetic storage medium, a chip card, a CD-ROM, etc. In accordance with yet an added mode of the invention, the control information item will be input, particularly read, into the network. The control information item sent by the service provider by the network in this case is, in particular, an update of control software for the household appliance.

To read the transferred control information into the local area network, an infrared interface, a chip card reader, a CD-ROM drive, or a similar drive for reading magnetic and/or optical data media is provided. To this end, the control information is sent in physical form to the location of the household appliance upon an order by the user or customer. These data media are known to have sufficient durability. In accordance with yet an additional mode of the invention, as an alternative or as an additional function, the household appliance is provided with an axis point or a connection to a distributed network or global network through the local area network, for example, an HES or a similar system. This feature opens up the opportunity for purely electronic transmission of the control information without physical manufacture, e.g., on a CD or similar medium. The customer can, thus, perform an update from CD or directly from the Internet himself in the form of a control information item. An installation operation is, preferably, performed automatically, that is to say, including without any intervention by the customer or the operator of the household appliance. When the message is sent, a check can be carried out with the service provider to determine whether or not further updating of the control software ought to be carried out. Errors within an existing controller are easily corrected in this manner, and improvements to existing control software can be implemented quickly on the basis of such a method. The presence or assistance of a customer service engineer is no longer necessary based upon this and/or the above features. There is also no need for any additional appliances or hardware on the household appliance and/or within the local area network. In addition, no further significant costs arise besides the costs of electronically creating the information, in comparison with other possible methods. Dispatch, printing, and/or service costs, as well as a visit by an employee from a customer service department, in order to load new software into the household appliance with a customer in situ are, thus, eliminated based upon this embodiment of the present invention.

In accordance with again another mode of the invention, preferably, the control information item transferred to the local area network is also stored within the local area network. To such an end, a storage device is provided that can, advantageously, be contained in the server computer. The requested and/or updated control information item is, thus, available within the local area network in electronic form such that it can always be quickly retrieved. Alternatively, the storage device can be set up in the control of the household appliance itself, the updated program content that is read into the local area network through the Internet or through a CD or the like and is transmitted through the data lines continually being securely recorded in all cases. When a program is executed, the controller, then, does not revert to its internal program but, rather, always to this more up-to-date program. The local area network, thus, contains measures for storing and/or for repeatedly calling the transferred control information item at any point.

In accordance with again a further mode of the invention, at least some of the control tasks of the household appliance are preformed outside of the household appliance. The network to which the household appliance is connected always has at least one computer as a central computer or service computer available that provides much more computational power than the power existing in a household appliance. Preferably, the electronic controller for the household appliance is in the form of an intelligent switch. The function of the electronic controller is largely off whenever it is intended to perform functions or execute programs etc. for which the existing controller is no longer sufficient. In such a case, the internal control intelligence inherent to the appliance accepts the intervention or undertaking of control of the household appliance by computer through the local area network. Thus, at least some of the household-appliance control tasks are performed outside of the household appliance in a servo computer connected to the network, using the service provider's new control data. The controller for the household appliance, thus, now performs only basic functions, for example, such as fitting actuators, and interrogating sensors, safety functions, real-type functions, and network communication, involving the sending and receiving of messages. This shift within the local area network, therefore, further follows the concept of joint use in the networking of existing resources in the overall system. The period of use or useful life of a household appliance equipped in this manner is greatly extended overall by the flexible adjustability of its scope of functions. Limiting factors that arise are, then, just the electromechanical characteristic data for the household appliance, such as motor power or deficiency.

In accordance with again an added mode of the invention, advantageously, an individual appliance number for the respective household appliance is used as an address at least within the local area network. The appliance number for the household appliance is an individual alphanumeric character string that is stored internally as a unique identifier in the household appliance. Alternatively, part of the appliance number can be used very advantageously. Because every household appliance and also any other appliance has an individual appliance number, this type of allocation of an individual address being fitted at the location of the household appliance is no longer necessary. All work has already been carried by the manufacturer, with the individual appliance number, preferably, being stored internally in the respected household appliance in a non-volatile memory. In this context, this appliance number can also contain special information in addition to the appliance type, such as information about particular modules, a piece of standard software, data relating to the date of manufacture, and the production sites etc., which can be useful when implementing the message from the customer in question.

In accordance with again an additional mode of the invention, advantageously, the control information transferred through the network has an associated operating manual or a help function appended thereto. This help is provided for the user on request, particularly, on the actual household appliance in question. In one embodiment of the invention, at least some of the information transferred through the network is, accordingly, conditioned and/or displayed on a more suitable appliance, preferably, a computer or a television, in the local carrier network within the household as the location.

In addition, household appliances today increasingly have display devices, such as plain text displays that, in one development of the invention, are used to provide for displaying a graphical user interface, for example. The information for producing an, in particular, intuitive user guide is also conveyed to the household appliance by the control information. With the rapid progress in the manufacturer of even more flexible displays or other display media, particularly, based upon illuminating and/or colored polymers, the price of manufacture for displays falls further as resolution increases, or with a higher density of pixels, thus, information in graphical form can also be displayed without any difficulty, preferably, with images or symbols.

In accordance with still another mode of the invention, a display apparatus for the household appliance is configured to show, by way of example, a graphical user interface and/or to label control elements of a household appliance. Provided that no touch-controlled are being used, known control elements, such as rotary switches or knobs are disposed in an area of the display such that the display labels them in terms of function. In one preferred embodiment, largely unlabeled switches are integrated in a display or are framed thereby. Hence, for the updated control, an associated operating and display technique is also automatically transmitted to a household appliance through the network. In addition, an associated operating manual can also be appended to the information transferred from the service provider through the network, likewise in paperless format. The operating manual is displayed, announced or else printed only by the customer in situ. This, advantageously, limits a service provider's investment for a method in accordance with the invention to the construction or partial rental of a corresponding network and to conditioning of the information that needs to be sent to the household appliances. To show the information, the service provider simply uses the display devices already available as standard on household appliances without any further intrinsic costs.

Preferably, a short help is provided that, when requested by the user by operating respective key or other control elements on the household appliance, can very advantageously be called up to give brief instruction about the function of a key etc. This short help is, preferably, stored in the local area network's storage measures described above.

In accordance with still a further mode of the invention, personal data are, preferably, input in the local area network. These data are necessary, to a certain extent, for addressing requested control information for the service provider, for example, particularly for determining a location for the household appliance. These data are also needed in the case of a service for a cost is charged, however. In such a case, the data are automatically added to a message from a household appliance. In accordance with still an added mode of the invention, however, personal data are automatically added only after approval by a user or customer, the approval being given particularly for a purpose and/or based upon a definition by a user or customer.

In accordance with still an additional mode of the invention, the local area network is, preferably, in the form of a star structure, for example, in the form of "HES" as a cable-connected or line-connected system. Hence, the present invention also allows the advantageous properties of the local area networks to be used with an interconnection of different appliances in a household, for example, to display and/or to output an up-to-date operating manual. Any alteration by connecting a new appliance also corresponds only to the addition of a ray and, advantageously, not to a temporary interruption, as is necessarily the case with a ring structure. In one development of the invention, the local area network is provided with an access point to a global network and, in particular, with an Internet access point. The access point to the global network is, preferably, provided by a telephone line.

In accordance with another mode of the invention, the household appliance and/or the local area network can also be connected to the service provider by a power supply line, this connection, in turn, also preferably being in the form of an Internet connection. Physical extension in all the households can, thus, be dispensed with, and inventive household appliances can be used universally.

In accordance with a further mode of the invention, in addition, the household appliance can, preferably, also be connected to the local area network by a wireless data link, for example, by radio or infrared data traffic. Alternatively, the local area networks, for their part, can be connected to a global network by a wireless data link, in particular, by a mobile radio link. In one embodiment of the invention, however, particularly in the case of wireless data interchange, the household appliance can also be connected to a service provider of a provider and/or operator of a distributed global network by a radio link in the form of a long-distance connection. This fast direct link allows an alternatively available connection in a local data network to be used deliberately to transmit, by way of example, a message with its relatively brief data content to a service provider more quickly.

With the objects of the invention in view, in a local area network connected to a plurality of household appliances, there is also provided an apparatus for controlling a household appliance connected to the local area network for receiving control information therefrom, including an interface connected to the local area network, a programmable electronic controller connected to the interface for receiving the control information in the form of at least low-level control commands, subprograms, and programs, the controller programmed to send a message to the local area network to request the control information, the message containing a basic information item including a request for at least one of a new control program, an improved control program, and an extended control program, and a device connected to the controller for at least one of evaluating and converting the control information.

With the objects of the invention in view, in a household appliance, there is also provided a control system, including an interface to be connected to a local area network for receiving control information therefrom, a programmable electronic controller connected to the interface for receiving the control information in the form of at least low-level control commands, subprograms, and programs, the controller programmed to send a message to the local area network to request the control information, the message containing a basic information item including a request for at least one of a new control program, an improved control program, and an extended control program, and a device connected to the controller for at least one of evaluating and converting the control information.

Advantageously, a method in accordance with the invention and a corresponding apparatus provide novel opportunities for requesting and transmission of specific control information. The scope of the control information can be set based upon the stipulation described above, with household appliances also having properties available from a service provider through the network. A method in accordance with the invention, thus, also discloses a new business area for the manufacturer of household appliances in accordance with the invention. The manufacturer appears as service provider or network provider and provider of different services that is available at any time, the service for its part also being detected centrally with the service provider and being able to be chargeable to a customer, depending on the embodiment. The appliance manufacturer, as service provider, can provide this service like the services provided as mentioned above. A request for such services can be in a form subject to a charge. The use of such a request is, preferably, chosen at will by the operator of household appliances of the customer. In this context, the necessary information is processed in the form of electronic data, which means that management of infantry in stock for the information shrinks to the size of modern flexible electronic bulk storage media and, correspondingly, more powerful computer installations.

Other features that are considered as characteristic for the invention are set forth in the appended claims.

Although the invention is illustrated and described herein as embodied in a method and apparatus and control system for controlling household appliances, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
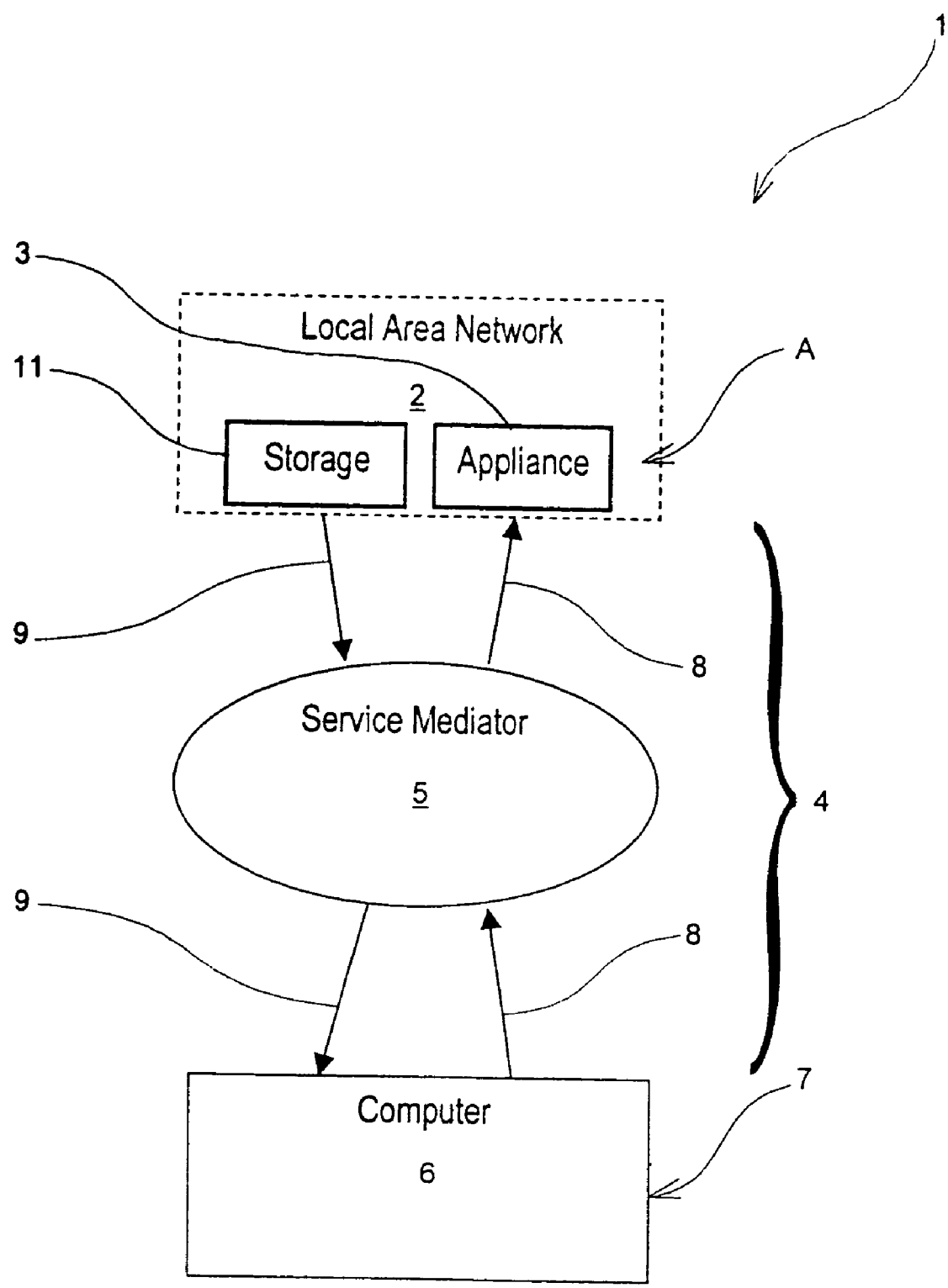
FIG. 1 is a block circuit diagram of a connection between an system of network to household appliances at one location and an external service provider according to the invention.

Referring now to the figures of the drawings in detail and first, particularly to FIG. 1 thereof, there is shown an inventive control system 1 having a local area network 2 with a household appliance 3 at a location A of a service user, that is to say, the operator of the household appliance 3 of the customer of the system 1. A global network 4 associated with the service mediator 5 connects the local area network 2 to an external computer unit 6 associated with the service provider 7, the external computer unit 6 being configured for conditioning and sending control information 8.

To make contact with the service provider 7 at the request of the customer at the location A of the household appliance 3, a message 9 is sent from the household appliance 3 to the service provider 7. This message 9 contains, as a fundamental component, a request catalog for a control information item 8 specifically created based upon the message 9 with the service provider 7. In addition, the message 9 contains an individual appliance number that clearly distinguishes the household appliance 3 in question even within a group of similar appliances. This individual appliance number is the address of the household appliance 3 within the local area network 2, which address allows the service provider 7 to identify the sending household appliance 2 completely. From a storage device 11, the message 9 is also extended within the local area network 2 by person-related and residence-related information that allows the requested control information 8 to be calculated and/or transferred in physical form as a data medium to the operator of the household appliance 3 at the location A. In the simplest case, mainly that of a service being provided free of charge, a residence-related information item includes only the full address and the form of address wanted for a written letter.

The requested control information item 8 is an up-to-date machine program that has been optimized for an instance of application based upon the message 9 that is being prepared by the customer and has been transferred from the location A. This control program is generated in the external computer unit 6 of the service provider 7 and is, then, transferred for execution to the local area network 2 through the global network 4. In the local area network, the control information item 8 is conditioned and is forwarded to the household appliance 3. When the program has been executed, the special situation characterized by the previously transmitted system data no longer exists. However, it has been abstracted in a form such that it can arise again. Thus, the execution machine program is stored, but not in the house of appliance 3 in question, but rather in the storage device 11. If required, the machine program stored in electronic form is, then, requested from the local area network 2, again, by the household appliance 3.

This continued renewing of the functionality of the house of appliance also extends the functional scope because the capabilities of the household appliance 3 are permanently aligned with a current requirement. The control of older appliances is, thus, also not excluded by scientific/technical progress because the scope of power or function is respectively aligned by the control. This significantly extends the household appliance's useful life or period of use. The household appliance 3 is also provided with less complex electronic control because it obtains its control intelligence through the local area network 2. An internal memory for washing programs, custom-service programs and appliance testing programs are, thus, also not necessary, which means that the household appliance 3 can still be controlled directly by the manufacturer in the production test. The household appliance described is, thus, also more reliable against failure on the whole. The service provider finances its involvement by virtue of this service being chargeable to the customer at the location A. In addition, the service provider commits every customer to it on the long-term basis, that is to say, for any new purchases.

Figure 2:
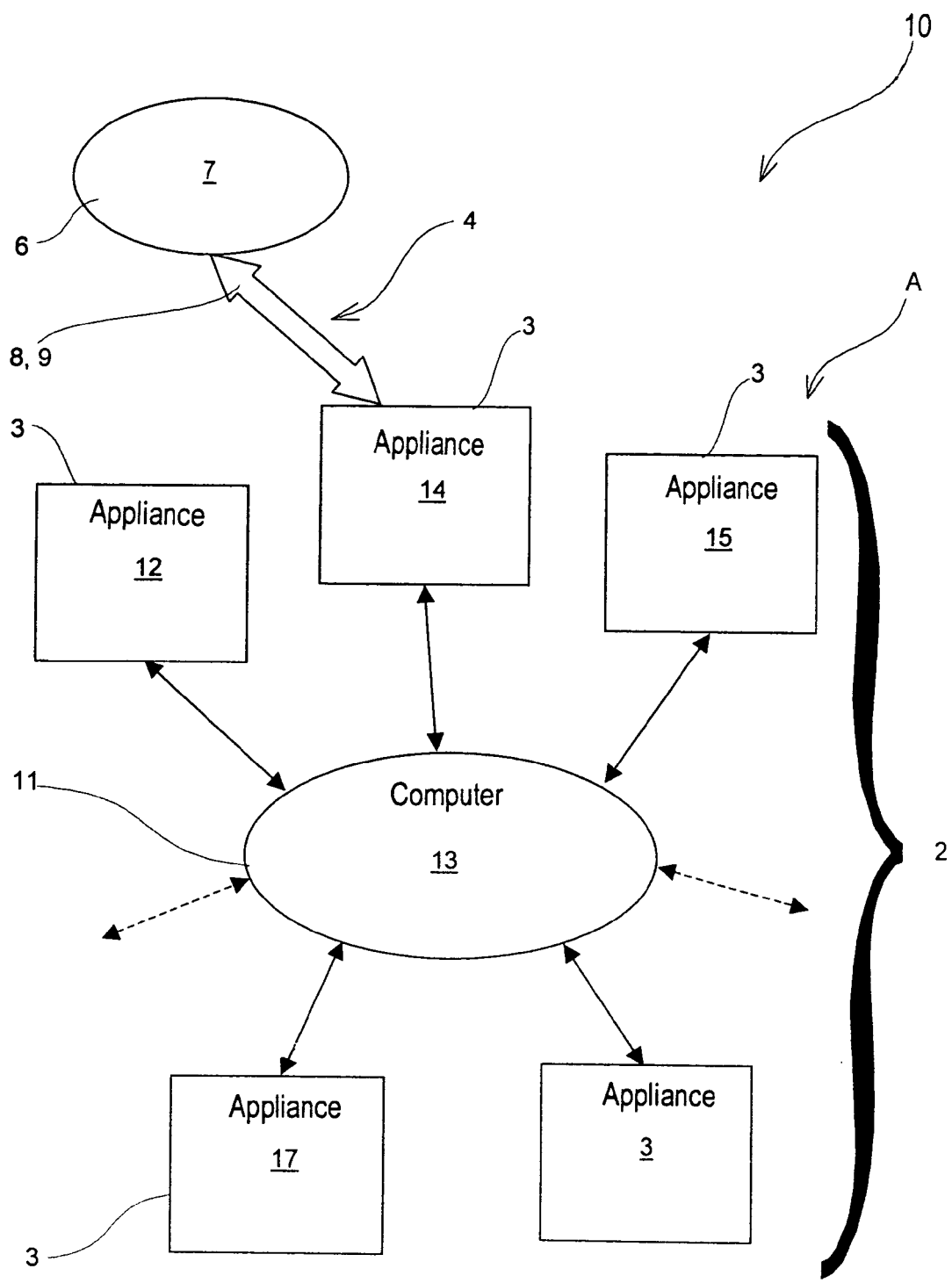
FIG. 2 is a block circuit diagram of logic of an information system according to the invention.

FIG. 2 shows a logic diagram to give a basic illustration of an information system 10, in accordance with the invention, having a local area network 2 and various networked household appliances 3 connected thereto in a household, shown by way of example at the location A. In this case, all schematically illustrated household appliances 3 are configured for sending a respective message 9 through the local area network 2 and, subsequently, through the global network 4 to the service provider 7. The following are shown as examples of household appliances 3 in an average household: a washing machine 12, a computer 13, a telephone 14, and a coffee machine 15.

At the transition part of the location A, that is to say, as transmission parts within the local area network 2 with the household, the lines of a power supply are provided, to which each of the household appliances 3 imperatively needs to be connected for supplying the appliance 3 with electrical power. In such a case, every household appliance 3 is provided with an individual identifier, namely its individual manufacturing number as an address in the local area network 2. Thus, in the household A, every household appliance 3 receives the respectively requested control information 7 from the local area network 2. A message 9 from one of the household appliances 3 is forwarded directly to the centrally positioned computer 13 in the illustrated star structure of the local area network 2 and is sent from the computer 13. This done using an Internet access point that, however, is provided only on the computer 13 but makes the local area network 2 available to all connected household appliances 2. In the embodiment in FIG. 2, personal data are input in the local area network 2, preferably, in a convenient form through the computer 13. These sensitive data are automatically added to a message 9 from a household appliance 2 to allow a service provider 7 to determine the location A of the household appliance 3. For reasons of data protection, personal data are appended in this manner only after, in particular, purposeful approval by a user or customer.

The message 9 automatically prompts the service provider 7 to select, condition and send a corresponding control information item 8 as acknowledgement to the customer at the location A. Such control information 8 can be very short and conversely stored, by way of example, on a chip card and transferred in physical form together with an invoice to the customer. In the age of online banking or user identification, a card reader is already provided on many computers, even in the household sector, as a way of preventing theft and break in. This reader is, now, also used to read the control information 8, transferred to the household appliance 3 in question by the local area network 2 following conditioning by the computer 13. Additional hardware or readers on the household appliances 3 themselves are, thus, not necessary. The address in question can be taken from the message 9 of an individual appliance number and can also be held on the data medium. Apart from unpacking of the data medium and insertion thereof into a reader, the data are, thus, loaded automatically.

As a result of local area network 2, the illustrated system 1 has the option of allowing display and/or reproduction on any household appliance 3 or other electrical appliance that can be selected by the customer at the location A. A telephone 14 is, then, used for visually or audibly reproducing supplementary information or a key-related short help if display on the actual household appliance in question is not possible. Visual display takes place in short form as a Short-Message Service (SMS) on the display on the telephone 14. Using the local area network 2, the supplementary information item is displayed and reproduced particularly advantageously on the television 17. In the modern computer 13, this supplementary information is displayed in a window opening centrally on the screen with reproduction of pictures and sound.

The current control information item 8 with all the extensions described above is no longer delivered in physical form as a printed document, as a compact disc, or the like when transferred through email. A message in accordance with the invention, thus, makes a valuable contribution to reducing the costs of the manufacturer and/or for a service provider. Instructions for use etc. that are matched to the current control information item 8 are, then, viewed on the computer 13 and are printed only if required.

In addition, new business areas are opened up to a manufacturer of household appliances 3 with the provision of analyzed data and collected customer requests from messages 9 and the operation of a corresponding network 3. Progressing products innovation and maintenance of contact with existing customers, advantageously, also strengthens the customers' brand loyalty.

We claim:

1. A method for controlling a household appliance including at least one device for receiving physical goods and being operable to change the condition of the goods within the household appliance, which comprises:

connecting the household appliance to a local area network, the household appliance having an internal control unit for controlling the household appliance;

sending a message from the household appliance to the local area network to request control information concerning the change of condition to be performed on the goods, the message containing a basic information item including a new request from a user for a control program, the control program being at least one of a new control program, an improved control program, and an extended control program, the control information having at least one of low-level control commands, subprograms, and programs;

receiving, with the household appliance, the control information from the local area network following a request by the user; and controlling the household appliance by at least one of evaluating and converting the control information at a location of the household appliance.

2. The method according to claim 1, which further comprises requesting the control information by sending the message to a service provider for a transfer of the control information.

3. The method according to claim 2, which further comprises sending the message from the local area network to the service provider at least one of by telephone, by fax, by email, by a voice communication channel, and by a data transmission communication channel.

4. The method according to claim 2, which further comprises developing the respectively required control information at the service provider as a program taking into account the request by the user.

5. The method according to claim 4, which further comprises developing the respectively required control information as a program taking into account requests from the user.

6. The method according to claim 4, which further comprises developing the respectively required control information as a program taking into account requests from the user with mapping on a corresponding virtual machine at the service provider.

7. The method according to claim 1, which further comprises:

providing the household appliance with control software having individually produced special programs and normal control programs; and making available interfaces to individual basic functions repeatedly occurring as subprograms within at least one of the individually produced special programs and the normal control programs in the control software.

8. The method according to claim 1, which further comprises transmitting the control information in the form of pure data through the local area network to the household appliance.

9. The method according to claim 1, which further comprises sending the control information to the household appliance at the location of the household appliance.

10. The method according to claim 1, which further comprises transmitting the control information through the local area network to the household appliance.

11. The method according to claim 1, which further comprises at least one of inputting the control information into the local area network and reading the control information into the local area network.

12. The method according to claim 11, which further comprises reading the control information the local area network through at least one of an infrared interface, a chip card reader, a CD-ROM drive, a drive for reading a magnetic data media, and a drive for reading optical data media.

13. The method according to claim 1, which further comprises:

providing the household appliance with control software; and providing the control information as an update of a piece of the control software from the service provider through the local area network.

14. The method according to claim 1, which further comprises:

connecting a central computer to the local area network; and performing at least some control tasks of the household appliance outside the household appliance in the central computer.

15. The method according to claim 1, which further comprises:

providing the household appliance with an individual appliance number; and utilizing the appliance number as an address at least within the local area network.

16. The method according to claim 1, which further comprises:

providing the control information transferred by the local area network with at least one of an associated operating manual and a help function; and making the at least one of the operating manual and the help function available to the user.

17. The method according to claim 16, which further comprises complementing the control information transferred through the local area network with at least one of the operating manual and the help function on the user's respective household appliance.

18. The method according to claim 1, which further comprises storing the control information transferred to the local area network within the local area network.

19. The method according to claim 1, which further comprises providing the household appliance with at least access to one of a distributed network and a global network through the local area network.

20. The method according to claim 19, which further comprises providing the household appliance with at least access to a home electronic system.

21. The method according to claim 1, which further comprises providing the household appliance with a connection to one of a distributed network and a global network through the local area network.

22. The method according to claim 1, which further comprises at least one of conditioning and displaying at least some of the information transferred by the network on an appliance in the local area network within a household at the location.

23. The method according to claim 22, which further comprises at least one of conditioning and displaying at least some of the information transferred through the network on at least one of a computer and a television within the household at the location.

24. The method according to claim 1, wherein the household appliance includes a washing machine.

25. A method for controlling a household appliance including at least one device for receiving physical goods and being operable to change the condition of the goods within the household appliance, which comprises:

connecting the household appliance to a local area network, the household appliance having an internal control unit for controlling the household appliance;

sending a message from the household appliance to the local area network to request control information concerning the change of condition to be performed on the goods, the message containing a basic information item including a new request from a user for a control program, the control program being at least one of a new control program, an improved control program, and an extended control program, the control information having at least one of low-level control commands, subprograms, and programs;

receiving, with the household appliance, the control information from the local area network following a request by the user;

controlling the household appliance by at least one of evaluating and converting the control information at a location of the household appliance; and sending the control information to the location of the household appliance by a service provider in the form of a data medium.

26. The method according to claim 25, which further comprises sending the data medium as a magnetic storage medium, a chip card, or a CD-ROM.

27. A method for controlling a household appliance including at least one device for receiving physical goods and being operable to change the condition of the goods within the household appliance, which comprises:

connecting the household appliance to a local area network, the household appliance having an internal control unit for controlling the household appliance;

sending a message from the household appliance to the local area network to request control information concerning the change of condition to be performed on the goods, the message containing a basic information item including a new request from a user for a control program, the control program being at least one of a new control program, an improved control program, and an extended control program, the control information having at least one of low-level control commands, subprograms, and programs;

receiving, with the household appliance, the control information from the local area network following a request by the user;

controlling the household appliance by at least one of evaluating and converting the control information at a location of the household appliance;

providing the household appliance with at least access to one of a distributed network and a global network through the local area network;

inputting personal data in the local area network; and automatically adding the personal data to the message from the household appliance.

28. The method according to claim 27, which further comprises automatically adding the personal data to the message from the household appliance to determine the location for the household appliance.

29. The method according to the claim 28, which further comprises adding the personal data only following an approval by the user.

30. The method according to the claim 28, which further comprises adding the personal data only following an approval by the user for a particular purpose.

31. A method for controlling a household appliance including at least one device for receiving physical goods and being operable to change the condition of the goods with the house hold appliance, which comprises:

connecting the household appliance to a local area network, the household appliance having an internal control unit for controlling the household appliance;

sending a message from the household appliance to the local area network to request control information concerning the change of condition to be performed on the goods, the message containing a basic information item including a new request from a user for a control program, the message including a catalog of requirements for the control information, the control program being at least one of a new control program, an improved control program, and an extended control program, the control information having at least one of low-level control commands, subprograms, and programs;

receiving, with the household appliance, the control information from the local area network following a request by the user, the control information being specially created at a service provider on the basis of the message; and controlling the household appliance by at least one of evaluating and converting the control information at a location of the household appliance.

32. The method according to claim 31, wherein the household appliance includes a washing machine.

* * * * *